Sept. 17, 1929.　　　S. HERR　　　1,728,904
POSITION INDICATOR
Filed July 11, 1921　　　2 Sheets-Sheet 1
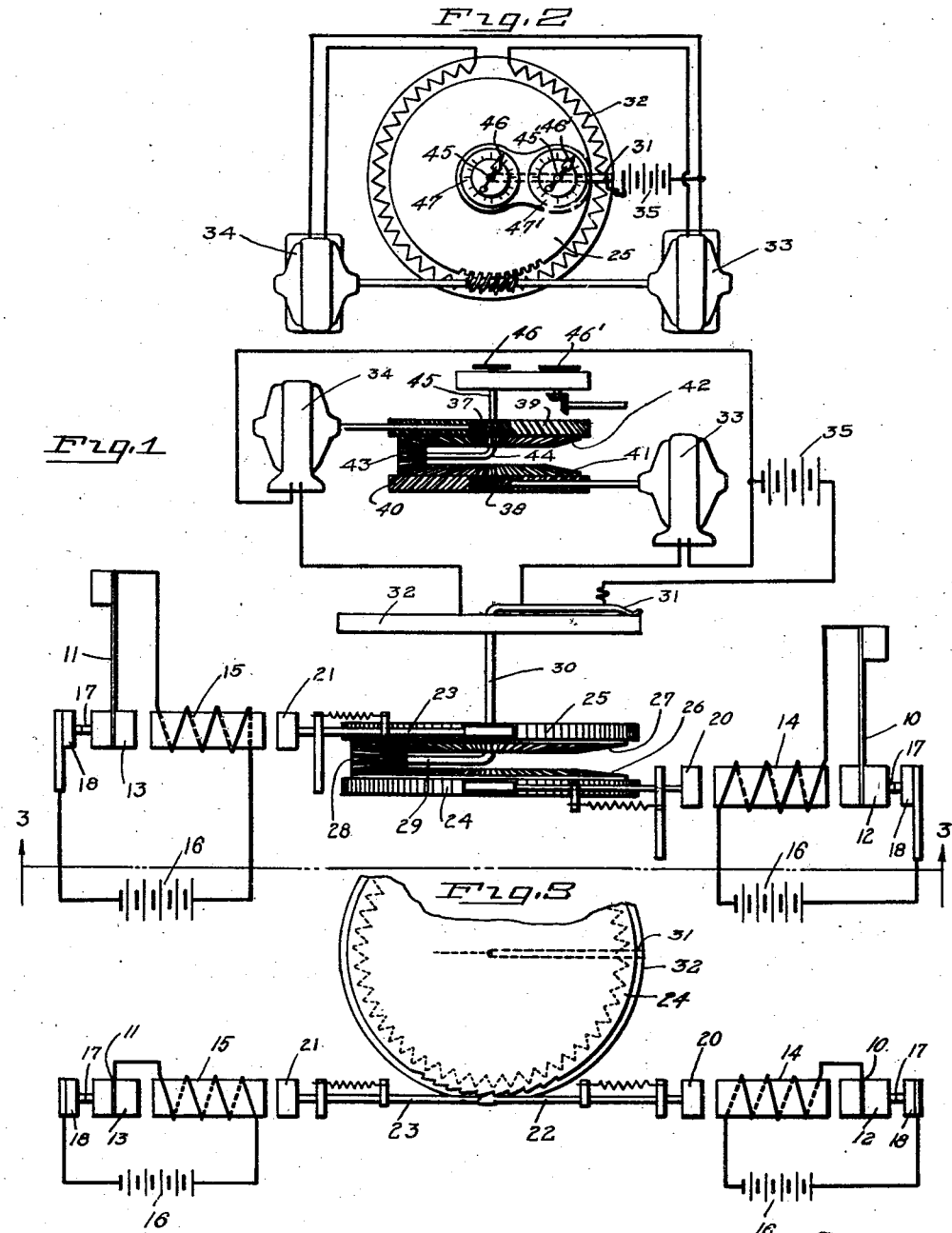
Inventor
SHIRL HERR.
By Hood & Shley
Attorneys Sept. 17, 1929.     S. HERR     1,728,904
POSITION INDICATOR
Filed July 11, 1921     2 Sheets-Sheet 2
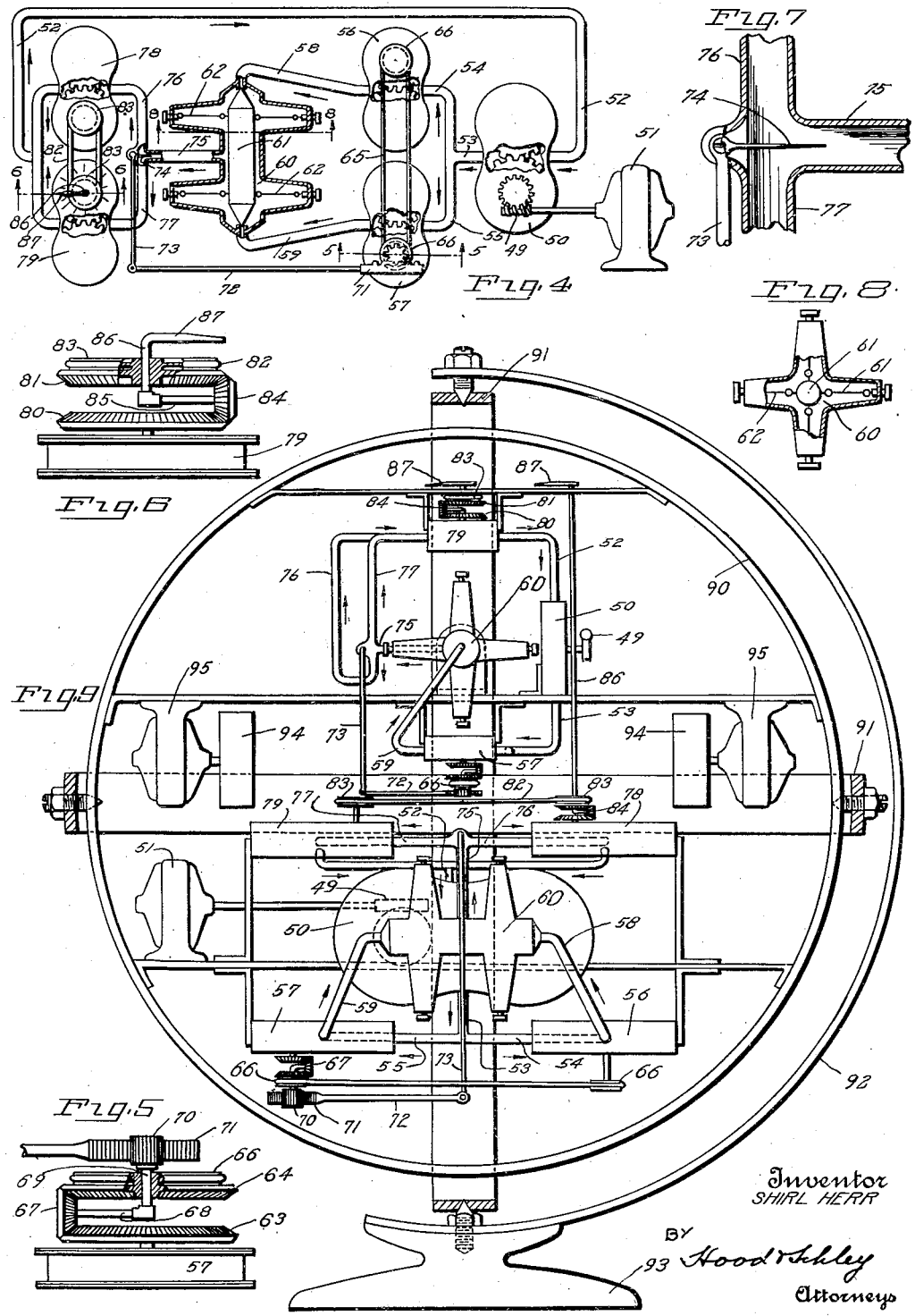
Inventor
SHIRL HERR
BY
Hood & Ashley
Attorneys Patented Sept. 17, 1929

1,728,904

UNITED STATES PATENT OFFICE

SHIRL HERR, OF CRAWFORDSVILLE, INDIANA, ASSIGNOR OF ONE-HALF TO LUTEN ENGINEERING COMPANY, OF INDIANAPOLIS, INDIANA, A CORPORATION OF INDIANA

POSITION INDICATOR

Application filed July 11, 1921. Serial No. 483,989.

It is the object of my invention to indicate the position of a traveling object, such as an automobile or aeroplane, with respect to its starting point, by mechanism which is wholly self-contained.

In a simple form of my invention the indication may be of the distance actually traveled, having relation to only the forward and backward movement of the machine regardless of direction; but in the preferred form of my invention the indication will be of the final position of the traveling object with respect to its starting point, giving both the distance and direction of the change of position independently of the course traveled. Thus the indication may be that the indicated position is X miles east and Y miles north of the starting point; and, if desired, that there has been a change in altitude of Z feet.

In carrying out my invention, I provide means which is affected by acceleration in the traveling object, positive or negative, in a given direction in respect either to the course of travel of the traveling object or in respect to space, and by such acceleration-controlled means I control oppositely two motive devices which by their differential movement control the position of a controlling device, which in turn controls two motors which by their differential movement operate an indicator, which thus indicates the total distance traveled in the direction to which the device is responsive. If it is desired to indicate merely forward and backward travel, but one device is provided, with the acceleration-affected means responsive to the acceleration to the forward or backward direction of movement of the object; but if the final position independent of the course of travel is desired, I may provide two or three devices—three if altitude is desired as well as geographical location—and mount these devices in a gimbal-supported frame so that one will be responsive say to acceleration north or south, another to acceleration to east or west, and another to vertical acceleration if altitude is desired, and maintain the gimbal-supported frame in proper position in any suitable way, as by a gyroscope.

The accompanying drawings illustrate my invention: Fig. 1 is a diagrammatic view of the elements of one form of my invention, in which the parts are electrically operated; Fig. 2 is a plan of the indicator of Fig. 1, with its two operating motors; Fig. 3 is a plan of the acceleration-affected means of Fig. 1, with the motive devices and controller associated therewith; Fig. 4 is a diagrammatic view similar to Fig. 1, but with the parts arranged to be operated by fluid pressure; Fig. 5 is a section on the line 5—5 of Fig. 4; Fig. 6 is a section on the line 6—6 of Fig. 4; Fig. 7 is an enlarged view of the control valve; Fig. 8 is a section on the line 8—8 of Fig. 4, through the acceleration-affected means; and Fig. 9 is a diagrammatic view showing the mounting of two fluid-pressure-operated devices embodying my invention and set at right angles to each other and mounted in a gimbal-supported frame maintained in a definite position in space by suitable gyroscopes.

Referring first to the arrangement shown in Figs. 1, 2, and 3, let it be assumed for simplicity that only one direction is to be considered, which may be either a fixed direction in space, if the device is gyroscopically mounted, or a direction fixed with relation to the direction of travel of the traveling object, such as the automobile or aeroplane. In this form of my invention, two reeds 10 and 11 are arranged so that they can vibrate in the line of such direction, which line may be north and south, or east and west, or vertical, if the device is gyroscopically mounted, or may be in the line of travel of the vehicle if it is not gyroscopically mounted. The vibrating reeds 10 and 11 carry armatures 12 and 13, which are acted upon by electro-magnets 14 and 15. These two magnets are supplied from any suitable source or sources of current, here shown as independent batteries 16, and the circuit for each magnet is completed from its energizing battery through such magnet, the vibrating reed 10 or 11, a contact 17 carried by the respective armature 12 or 13, and a fixed contact 18 connected to the remaining terminal of the battery. Thus each magnet 14 and 15 and its vibrator with its connections constitute in effect an ordinary buzzer, in which the armature is attracted by the energization of the magnet, and the magnet circuit is broken by the magnet-produced movement of the armature, permitting the armature to be swung back by the resiliency of its reed to reestablish the magnet-energizing circuit. The two magnets 14 and 15 with their associated parts operate in synchronism while the device is at rest. However, upon acceleration in the given direction, such acceleration increases the returning force on one of the armatures 12 and 13 and diminshes it on the other, supplementing the spring action of the reed 10 and 11 in the first case and opposing it in the second, and thus causing the rate of vibration of one armature to be increased while that of the other is decreased. This change of rate of vibration in the two armatures continues during the acceleration, positive or negative, but ceases when the acceleration is completed, regardless of the final speed attained.

The rate of vibration of the armatures 12 and 13 control the rate at which the respective magnets 14 and 15 are energized and de-energized, such rate for one magnet increasing and that for the other decreasing during acceleration. The magnets 14 and 15 act on other armatures 20 and 21 in addition to the armatures 12 and 13, attracting such armatures 20 and 21 every time they are energized. The two armatures 20 and 21 are connected to ratchet dogs 22 and 23 respectively, which ratchet dogs act on ratchet wheels 24 and 25, and operate them in opposite directions, at speeds determined by the rate at which the magnets 14 and 15 respectively are energized and deenergized. The two ratchet wheels 24 and 25 are in axial alinement, and are provided with bevel gears 26 and 27 between which is a bevel pinion 28 on an arm 29 carried by a shaft 30 which also carries a rheostat arm 31. When the two armatures 12 and 13 have the same rate of vibration, so likewise do the armatures 20 and 21, and the ratchet wheels 24 and 25 rotate with equal speeds in opposite directions, so that there is no movement of the arm 29 and rheostat arm 31; but when there is acceleration, and one armature 12 or 13 vibrates more rapidly than the other, so does the corresponding armature 20 or 21, thus causing a correspondingly increased speed of rotation of the ratchet wheel 24 or 25 over that of the other, with a resultant movement of the arm 29 and rheostat arm 31 in one direction or the other. Such movement of the rheostat arm 31 continues during acceleration, in one direction for positive acceleration and in the other for negative acceleration with respect to the given direction, and ceases when the acceleration ceases, leaving the rheostat arm in the new position to which it has been moved, which position is thus a function of the velocity of the traveling object.

The rheostat arm 31 moves over a resistance element 32, to vary oppositely the two parts of such resistance lying on opposite sides of such rheostat arm. The two ends of the resistance element 32 are connected to two motors 33 and 34 respectively, the other terminals of such motors being connected in common, as shown, to one terminal of a battery 35 or other suitable source of current, and the other terminal of such battery being connected to the rheostat arm 31. Thus the speeds of the two motors 33 and 34 are both dependent on the position of the rheostat arm 31, and are varied oppositely by a movement of such arm.

The two motors 33 and 34 drive worms 37 and 38 respectively, and these worms drive two axially alined worm wheels 39 and 40 provided with bevel gears 41 and 42 respectively; these bevel gears operate on a bevel pinion 43 mounted on an arm 44 of a shaft 45 which is coaxial with the gears 41 and 42 and is suitably connected to operate an indicator, shown here as a pointer 46 mounted on the upper end of the shaft 45 and movable over a suitable scale 47. When the two motors 33 and 34 operate at the same speed, so likewise do the bevel gears 41 and 42, and the arm 44 carrying the bevel pinion stands still, so that the pointer 46 also remains stationary; this is while the traveling object is at rest. When one motor 33 or 34 operates faster than the other, however, as occurs when the traveling object is moving, the arm 44 is turned in one direction or the other to move correspondingly the pointer 46 on the scale 47. The rate of travel of the pointer 46 depends upon the difference in speeds of the motors 33 and 34, and such difference in speeds depends on the position of the arm 31, and the position of the arm 31 depends upon the speed of movement of the traveling object in a given direction and varies upon any acceleration, positive or negative. Thus the rate of travel of the pointer is a direct function of the velocity of the traveling object in the given direction, and the position of the pointer 46 on the scale 47 indicates the distance traveled from the starting point in the given direction.

I have shown only a single pointer 46 acting over a single dial-scale 47; but this is merely for simplicity, and in practice the indicating mechanism operated by the shaft 45 would ordinarily not be so simple, even for indications for a single direction, because of the limits of a single dial. Any suitable indicator and scale, or group of indicators and scales could be used.

In Fig. 2 I have shown a supplementary indicator, comprising a pointer 46' movable over a scale 47'. This pointer 46' is on a shaft 45', which may be suitably driven, as when the device is gyroscopically mounted, to indicate distances traveled in a different direction from that indicated by the pointer 46—say east and west distances if the armatures 12 and 13 are responsive to north and south acceleration. The shaft 45' would be associated with a set of mechanism exactly corresponding with that associated with the shaft 45. This will indicate two-dimensional travel. For three-dimensional travel there will be three sets of indicators with their operating devices.

In the arrangement shown in Figs. 4 to 8 inclusive, a suitable pump 50 driven by a motor 51 moves a fluid, such as water or mercury, in a closed circulating system, the pump 50 receiving its supply from a pipe 52 and discharging it into a pipe 53. The pipe 53 branches into two pipes 54 and 55, which supply two hydraulic motors 56 and 57 respectively, and these hydraulic motors discharge into two pipes 58 and 59 respectively, which discharge oppositely into a common chamber 60. Mounted in this chamber 60 is a valve member 61, hung on supporting wires 62 or otherwise suitably mounted so that it may move in the line of the discharges of the pipes 58 and 59, which line is in that direction in which the device is to be responsive to acceleration. During acceleration, positive or negative, along this line, the valve member 61 moves in one direction within the chamber 60, to close partially the outlet from one of the pipes 58 and 59 and open the other outlet more widely. This causes an unequal division in the flow through the two motors 56 and 57, so that one of such motors runs faster and the other runs slower during such acceleration period. The motor 57 drives a bevel gear 63, being direct-connected thereto, and the other drives a bevel gear 64 in axial alinement with the bevel gear 63, the bevel gear 64 being connected to the motor 56 by a belt 65 and suitable pulleys 66. The two bevel gears 63 and 64 mesh with a bevel pinion 67 on an arm 68 projecting from a shaft 69, which lies in the axis of the gears 63 and 64, and this shaft carries a pinion 70 which meshes with a rack 71 on a rod 72 connected to the operating arm 73 of a control valve 74. The valve 74 and its operating parts back to the arm 68 are stationary when the two motors 56 and 57 are operating at the same speed, which is when there is no acceleration in the given direction and the outlets from the pipes 58 and 59 are of the same size; but when there is acceleration, and the valve member 61 is moved thereby in one direction or the other, the motors 56 and 57 operate at different speeds and the shaft 69 is thereby caused to turn to shift the position of the control valve 74. This difference in speed, with its resultant shifting of the control valve 74, continues while the acceleration continues, and ceases when the acceleration ceases, leaving the control valve 74 in the new position, which position corresponds to the speed attained by the traveling object in the given direction, so that such position is a function of the speed of the traveling object in such direction.

The control valve 74 is located at the end of the outlet pipe 75 from the chamber 60, and divides the fluid from such outlet pipe into two parts, which go into two pipes 76 and 77 connected to the pipe 75 at the valve 74. These two pipes 76 and 77 supply two fluid-pressure motors 78 and 79 respectively, the outlets of which discharge in common to the pipe 52, thus completing the closed circuit for the fluid travel. The position of the valve 74, controlling the division of the fluid between the two pipes 76 and 77, thus oppositely controls the speeds of the two motors 78 and 79, so that as the valve 74 is moved in one direction it causes one of such motors to go faster and the other to go slower. The motor 79 drives a bevel gear 80, and the motor 78 drives a bevel gear 81 which is in axial alinement with the bevel gear 80, the bevel gear 80 being shown as direct-connected to the motor 79, and the bevel gear 81 being shown as connected to the motor 78 by a suitable belt 82 and pulleys 83. A bevel pinion 84 meshes with the two bevel gears 80 and 81, and is mounted on an arm 85 from a shaft 86 co-axial with the bevel gears 80 and 81 and operating a suitable indicating device, such as a pointer 87 movable over the scale 88. The pointer is moved in one direction or the other according as one or the other of the motors 78 and 79 is rotating the faster, and thus serves to indicate the difference in the total number of rotations made by such two motors.

When the traveling object on which the indicator is mounted accelerates, positively or negatively, in the direction of movement of the valve member 61, the resultant movement of such valve member varies the relative rates of movement of the two motors 56 and 57, as already explained, and the differential movement of the two motors 56 and 57 changes the position of the control valve 74 so that the position of such control valve is a function of the speed of the traveling object. The position of the control valve 74 controls the relative speeds of the motors 78 and 79, and the differential of the speeds of such two motors produces movement of the pointer 87. Thus the indication of the pointer 87 on the scale 88 is a measure of the distance traveled in the direction in which the valve member 61 is subject to acceleration.

Either form of indicator, as shown in Figs. 1 to 3 inclusive, or as shown in Figs. 4 to 8 inclusive, may be mounted directly on the traveling object, to be responsive merely to forward and backward movements thereof without taking count of variations in the direction of travel. I prefer, however, to make the acceleration-affected parts of the indicator responsive to acceleration in a given direction which is independent of the traveling object itself. I do this by mounting the indicator in a frame 90 which is mounted in gimbals 91 in a main supporting frame 92 provided with a base 93 by which it is fixed to the traveling object, the gimbals being arranged to permit the frame 90 to remain in a definite position regardless of the movements of the frame 92 and of the traveling object; the gimbals thus preferably having three axes of movement each at right angles to the other two. The frame 90 is maintained in a definite position in any suitable manner, as by gyroscopes 94 mounted in said frame and rotated by driving motors 95. I have indicated these gyroscopes only diagrammatically, as they may be mounted and driven in any suitable manner to maintain a fixed position of the frame 90. Within the frame 90 I mount any desired number of my indicating devices, Fig. 9 showing two such devices of the type illustrated in Figs. 4 to 8 inclusive. There may be either more or less than two such devices if that is desired, though usually three is all that is ever required, to indicate changes in longitude, latitude, and altitude. As shown in Fig. 9, for indicating changes in longitude and latitude say, the acceleration-responsive means, here the control valve 61, will be set to be responsive to acceleration north and south for one indicator and to acceleration east and west for the other indicator. The two sets of indicating devices operate the two indicating pointers 87, each in the manner already described, one of the pointers 87 giving movements north or south from the starting point and the other movements east or west therefrom.

Distance travelled, which the embodiment of my invention herein described is designed to indicate, is a function of the time of travel. The first derivative of this function with respect to time is velocity, and the second derivative with respect to time is acceleration. With these facts in mind, my invention may be described as a device for indicating the value of a function of time, in which device I provide means affected by the second derivative of this function with respect to time, and by such means I control oppositely two motive devices which by their differential movement control the position of a controlling device in accordance with the value of the first derivative, and this controlling device in turn controls two motors which by their differential movement operate an indicator which indicates the value of the desired function.

I claim as my invention:

1. An indicating device, comprising a control member, means affected by acceleration in the traveling object of which the position is to be indicated for moving said control member so that its position is a function of the velocity of such traveling object, two power-driven motors the speeds of which are oppositely controlled by said control member, and an indicator operated jointly by said two motors at a velocity which is a function of the differential of the speeds of said two motors.

2. An indicating device, comprising a control member, two motive devices which jointly operate said control member to cause it to take a position which is a function of the difference between the total movements of said two motive devices, means affected by acceleration in the traveling object of which the position is to be indicated for oppositely controlling said two motive devices, an indicator, and motive means operating said indicator and controlled in speed and direction of movement by the position of said control member.

3. An indicating device, comprising a control member, two motive devices which jointly operate said control member to cause it to take a position which is a function of the difference between the total movements of said two motive devices, means affected by acceleration in the traveling object of which the position is to be indicated for oppositely controlling said two motive devices, two power-driven motors the speeds of which are oppositely controlled by said control member, and an indicator operated jointly by said two motors at a velocity which is a function of the differential of the speeds of said two motors.

4. An indicating device, comprising a control member, two constantly operated motive devices, means affected by acceleration in the traveling object of which the position is to be indicated for varying the relative speeds of said two motive devices, a differential device interconnecting said two motive devices and arranged to move said control member, an indicator, and motive means operating said indicator and controlled in speed and direction of movement by the position of said control member.

5. An indicating device, comprising a control member, two constantly operated motive devices, means affected by acceleration in the traveling object of which the position is to be indicated for varying the relative speeds of said two motive devices, a differential device interconnecting said two motive devices and arranged to move said control member, two power-driven motors the speeds of which are oppositely controlled by said control member, and an indicator operated jointly by said two motors at a velocity which is a function of the differential of the speeds of said two motors.

6. An indicating device, comprising a control member, means affected by acceleration in the traveling object of which the position is to be indicated for moving said control member so that its position is a function of the velocity of such traveling object, two constantly operated power-driven motors the relative speeds of which are varied by movements of said control member, a differential device interconnecting said two motors, and an indicator operated by said differential device.

7. An indicating device, comprising a control member, two motive devices which jointly operate said control member to cause it to take a position which is a function of the difference between the total movements of said two motive devices, means affected by acceleration in the traveling object of which the position is to be indicated for oppositely controlling said two motive devices, two constantly-operated power-driven motors the relative speeds of which are varied by movements of said control member, a differential device interconnecting said two motors, and an indicator operated by said differential device.

8. An indicating device, comprising a control member, two constantly operated motive devices, means affected by acceleration in the traveling object of which the position is to be indicated for varying the relative speeds of said two motive devices, a differential device interconnecting said two motive devices and arranged to move said control member, two constantly-operated power-driven motors the relative speeds of which are varied by movements of said control member, a differential device interconnecting said two motors, and an indicator operated by said differential device.

9. A device for indicating the value of a function of time, comprising two power-driven devices, means for oppositely controlling said power-driven devices in accordance with the value of the first derivative of such function with respect to time, and an indicator differentially controlled by said two power-driven devices for indicating the value of such function.

10. A device for indicating the value of a function of time, comprising a control member, two motive devices which jointly operate said control member to cause it to take a position which is a function of the difference between the total movement of said two motive devices, means affected by changes in the second derivative of such function with respect to time for oppositely controlling said two motive devices, motive means controlled in speed and direction of movement by the position of said control member, and an indicator controlled by said motive means and indicating the value of such function.

11. A device responsive to changes of velocity, comprising means affected by acceleration, a movable member, and two motive devices oppositely controlled by said acceleration-affected means which jointly operate said movable member to cause it to take a position which is a function of the difference between the total movements of said two motive devices.

12. A device for indicating the distance through which a traveling object moves, comprising a control member controlled in accordance with the velocity of such moving object, two power-driven devices the speeds of which are oppositely controlled by said control member, and an indicator operated jointly by said two power-driven devices at a velocity which is a function of the differential of the speeds of said two power-driven devices.

13. A device responsive to changes in the value of a function of time, comprising two motive devices, a movable member jointly controlled by said two motive devices, and means for oppositely controlling said motive devices in accordance with the value of the first derivative of such function with respect to time.

In witness whereof, I have hereunto set my hand at Indianapolis, Indiana, this 20th day of June, A. D. one thousand nine hundred and twenty-one.

SHIRL HERR.